Oct. 5, 1954  J. G. ERLERT  2,690,804
BEVELING MACHINE
Filed March 25, 1952  2 Sheets-Sheet 1
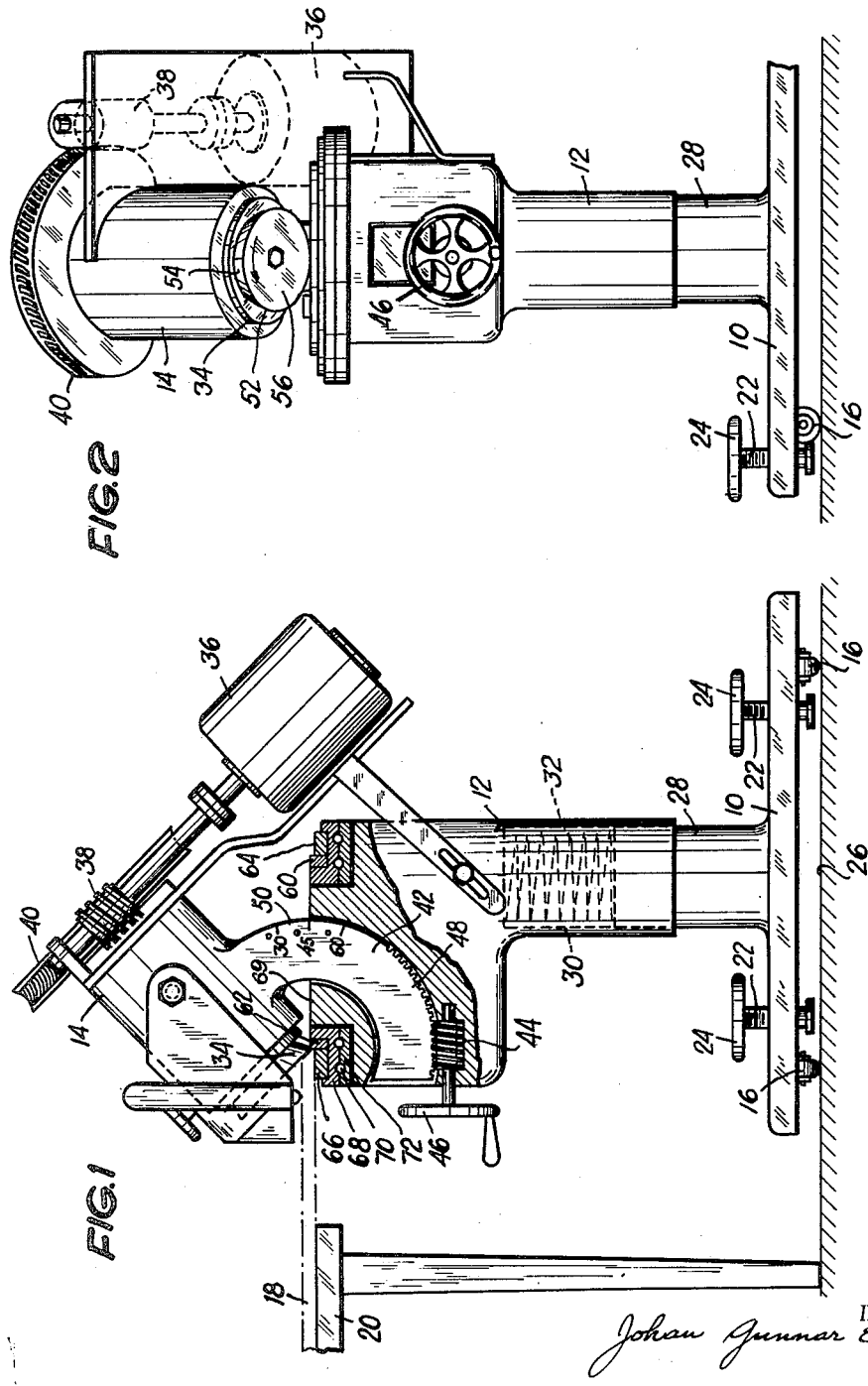
INVENTOR:-
Johan Gunnar Erlert,
BY Pierce, Scheffler + Parker,
ATTORNEYS.

Oct. 5, 1954  J. G. ERLERT  2,690,804
BEVELING MACHINE
Filed March 25, 1952  2 Sheets-Sheet 2
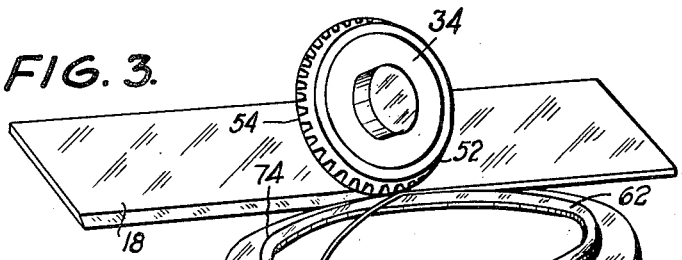
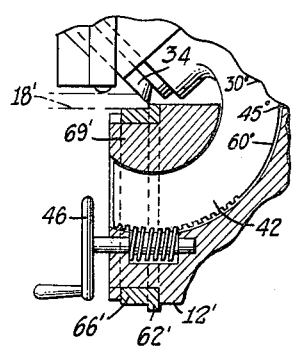
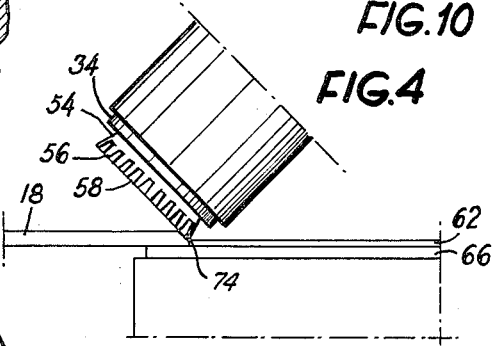
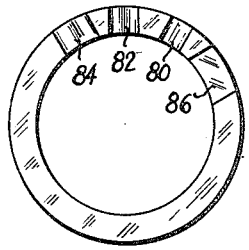
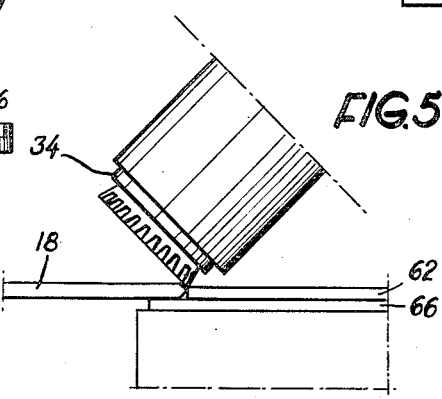
INVENTOR:-
Johan Gunnar Erlert,
BY Pierce, Scheffler & Parker,
ATTORNEYS.

Patented Oct. 5, 1954

2,690,804

UNITED STATES PATENT OFFICE 2,690,804

BEVELING MACHINE

Johan Gunnar Erlert, Kalmar, Sweden, assignor to Sven Fagrell, Solna, and Olof Cardell, Sollentuna, Sweden Application March 25, 1952, Serial No. 278,381

Claims priority, application Sweden August 31, 1951

9 Claims. (Cl. 164—61)

The present invention refers to machines for beveling the edges of sheet-metal and other work pieces of the type provided with a rotating cutting tool having a substantially circular cutting edge. Generally, the beveling has for its object to impart such a shape to the edge of a work that the latter can be united with another work in the most suitable manner, for instance by welding.

One object of the invention is to provide a beveling machine capable of beveling both straight and curved edges.

Another object of the invention is to provide a beveling machine for works of varying sizes and shapes, for instance for large-sized sheet-metal as well as for smaller works, such as flat bar iron and the like.

A further object is to make a beveling machine shiftable to different thicknesses of the material to be beveled.

The invention also has for its object to form a beveling machine so as to make it capable of beveling work for the production of V-joints as well as of X-joints.

Still further, the invention has for its object to make the machine easily manageable and of low procuring costs.

According to the invention, the machine is provided with a rotating cutting tool having a substantially circular cutting edge, said tool being so arranged in the frame of the machine that its cutting edge is directed obliquely to a movable supporting surface for the edge surface of the work, besides which the machine is provided with a supporting surface for the one side of the work adjacent to said edge surface. By the fact that the cutting edge of the cutting tool is directed obliquely to the surface which supports the edge surface, and the work is also supported on one side thereof, the work will be automatically maintained set against the supporting surfaces during the cutting operation. Such is the case independently of the shape of the edge operated upon, be it straight or curved. The mobility of the edge surface thus facilitates the feeding of the work. A particularly simple form of embodiment will be obtained, if the supporting surfaces are provided on members which are rotatable relatively to the frame of the machine, preferably on concentric rings. One of the supporting surfaces is then preferably formed by the envelope surface of one ring, while the other supporting surface is formed by a surface of the other ring at right angles to the axis of rotation.

Other details characteristic of the invention and advantages to be derived from the same will appear from the following description, wherein the invention is elucidated with reference to the accompanying drawings. Figs. 1 and 2 show the structure and appearance of the machine, Fig. 1 being an elevation with the frame partly sectioned, and Fig. 2 representing the machine in a front view. Fig. 3 is a perspective view, which illustrates how the tools bring about the beveled edge of a piece of sheet-metal. Figs. 4 and 5 show, in lateral projections corresponding to each other, how the edge of the sheet-metal is being cut as a preliminary for the making of a V-joint and an X-joint. Fig. 6 is a plan view of a modified supporting ring, and Fig. 7 a corresponding side elevation. Figs. 8 and 9, 10 and 11, 12 and 13 are end views and side elevations of three different works which have been cut in the machine having a supporting ring as shown in Figs. 6 and 7, and Fig. 1a is a fragmentary view similar to Fig. 1 illustrating a modified arrangement for mounting the supporting rings for the work.

As shown in Figs. 1 and 2, the machine is provided with a frame consisting of a base 10, an intermediate portion 12 and an upper portion 14. The base is supported by castors 16 so as to permit of being moved along the work, such as a piece of sheet-metal 18, which may then be placed on a table 20. Instead, the base may be kept standing still by means of adjustable legs in the form of screws 22 provided with manipulating wheels 24, by means of which the screws may be screwed down against the foundation, such as the floor 26, so that the base will be carried by the screws instead of by the castors. The work will thus be moved relatively to the machine during the beveling operation. The intermediate portion 12 is telescopically connected with the base 10 by the fact that a column 28 projecting from the base passes slidably into a recess 30 in the intermediate portion 12. Inserted into the recess 30 between the column 28 and the bottom of the recess is a spring 32, so that the intermediate portion will be carried through the intermediary of this spring. Hereby differences in the level between the foundation 26 carrying the machine and the work will be compensated for. Even if the machine be conveyed during the cutting operation by means of a movable foundation, such as a traverse, this spring may serve as an equalizing element.

The rotating cutting tool 34 is arranged in the upper portion 14 of the machine frame. This tool is driven by a motor 36 carried on the same upper portion, the operation of the tool taking place through the intermediary of a worm gearing 38, 40. The cutting tool may be adjusted for cutting in accordance with different bevel angles by the upper portion being provided with an arcuate support 42 fitting slidably into a corresponding guide in the intermediate portion 12 and provided with teeth 48 having a worm screw 44 meshing with the same, said screw being provided with a hand-wheel 46. The adjusted angle may be read off a scale 50. The cutting tool 34 is provided with a substantially circular cutting edge 52 (Fig. 2) limited by a conical envelope surface 54 and a preferably plane end surface 56. The conical surface may be provided with incisions to form the teeth 58 engaging the work during the cutting operation and aiding in the feeding of the same (Figs. 3–5).

The machine is provided with supporting surfaces cooperating with the work at the edge thereof subjected to beveling. These supporting surfaces consist of the envelope surface 60 of an edge supporting ring 62 and the substantially plane end surface 64 of a side supporting ring 66, said supporting rings being mounted in the intermediate portion 12 so as to be rotatable about a common axis at right angles to the plane of work in the operating position thereof. To this end they may be secured in a rotatable bearing ring 68 which is carried through the intermediary of balls 70 by a fixed stationary bearing ring 72. A central projection of the intermediate portion 12 forms a bearing stud 69 for the bearing ring 68. The end surface 64 extending at right angles to the axis of rotation of the bearing ring 68 forms a support for one side of the work, the lower side according to the drawing, besides the edge to be beveled while the envelope surface 60 of the supporting ring 62 supports the actual edge surface of the work and exerts a counterthrust against the edge of the work which is forced into contact with surface 60 by the cutting edge 52 of beveling tool.

The mode of operation of the machine described is broadly as follows:

When beveling is to be carried into effect, the beveling tool 34 is first adjusted by means of the hand wheel 46 to a degree corresponding to the desired bevel angle. As is evident from Fig. 1, the lowermost point on the cutting edge 52 of the beveling tool constitutes the center of radius of the arcuate support 42. Consequently such lowermost point remains fixed as the arcuate support 42 is adjusted to change the angle of the bevel to be cut. During the beveling operation the cutting edge 52 of the beveling tool 34 is directed obliquely to the envelope surface 64 of the supporting ring 62 at the point where the sheet-metal to be operated upon is supported and reaches substantially to the upper circular rim 74. When the beveling tool rotates, the toothed conical surface 54 of the same will engage the edge portion of the work to be cut away, and will press such edge portion obliquely against the upper circular rim 74 of the edge supporting ring 62, so that the edge material will be sheared off. The rim 74 then acts as a counterthrust edge and aids in the beveling operation. The easily movable supporting rings are carried along by the work so as to bring the bearing ring 68 with them during the beveling operation and turn about the stud 69.

By the arrangement of the beveling and supporting tools in the manner described a number of advantages will be obtained. In the first place, the work is kept by the beveling tool automatically in engagement with the supporting rings so as to be properly guided by the latter. Thus no special foundation is required for a small-sized work, which may be carried solely by the supporting rings and the tool. Inasmuch as the edge of the work is always kept in engagement with the envelope surface of the supporting ring 62 during the beveling operation, the beveling cut will automatically and accurately follow the edge of the work, no matter what shape the latter may present. Both straight and curved pieces of sheet-metal and the like may thus be beveled with the aid of the machine. Additional feeding members for the work are not required, inasmuch as the beveling tool itself takes care of the feeding of the work. Since the conical toothed surface of the tool engages the portion of the work to be sheared off, no marks of the teeth will be visible on the beveled work but only on the strip sheared off. On the other hand, the work will present a uniform obliquely beveled edge.

As will be seen from Fig. 3, the material cut off in the beveling operation forms an integral strip 76; on the other hand, no chips will be produced as in milling and planing.

It is to be noted that the edge supporting ring 62 only supports the work for a portion of the thickness thereof, that is to say, for the portion thereof which is not to be sheared off, the edge supporting surface being of a smaller height than the thickness of the work. Adaptation to works of different thicknesses may be effected by replacing the supporting ring 66 by another ring of a different height or by arranging a washer on the supporting ring. To facilitate the exchange, the supporting rings may, each of them, be divided into two semi-circular parts.

In the cutting of a bevel for an X-joint, the piece of sheet-metal may first be beveled on one side thereof, whereupon it is turned upside down to be beveled on the other side thereof. Fig. 4 illustrates beveling on one side as a preliminary for making a V-joint, and Fig. 5 shows a piece of sheet-metal which is cut on one side thereof and turned and operated upon on the other side thereof. The double beveling for an X-joint may instead be effected with the aid of two machines of the construction shown, which simultaneously operate upon the sheet-metal from opposite sides, or, if desired, this double bevel may be produced by a single machine provided with a rotating tool engaging on one side of the sheet-metal, and with another similar tool engaging the sheet-metal on the other side thereof.

The supporting ring may be formed with suitable recesses to form seats for works other than sheet metal. Figs. 6 and 7 illustrate a modified form of the supporting ring, in which there are three seats 80, 82, 84 for works having circular cross sections such as the round bars shown in Figs. 8, 9, 10 and 11, and one seat 86 for works having rectangular cross section such as the flat iron shown in Figs. 12–13. In Figs. 8–13, the surface along which the tool 34 has worked to remove material are denoted with 88.

The embodiment shown in the drawing is only to be considered as an example of applying the invention. A multitude of other constructions and modifications in many respects are conceivable within the scope of the invention. For example, the supporting rings may be conceived of as being mounted with a horizontal axis as shown in Fig. 1a. In this view, it will be seen that the intermediate portion 12' of the base is so constructed that the central projection 69' constituting a bearing stud for the ring means 62', 66' which support the work 18' extends horizontally rather than vertically so that rotation of the ring means is about a horizontal rather than a vertical axis as is the case when an embodiment according to Figs. 1–2 is utilized. Moreover it will be noted that the ring means in Fig. 1a are integrated into a single flanged ring structure comprising a first horizontal surface portion 66' for supporting the side of the work 18' adjacent the edge of the work and a second vertical counterthrust surface portion 62' for supporting the edge of the work.

What I claim is:

1. In a machine for beveling the edge of a work such as a piece of sheet metal, a machine frame, work supporting means rotatable about an axis at right angles to the plane of the work in the operating position thereof, said work supporting means having a substantially cylindrical counterthrust surface for supporting the edge of the work and a substantially plane surface at right angles to said axis for supporting one side of the work adjacent said edge thereof, said edge supporting counterthrust surface having a smaller height than the thickness of the work to be beveled, and a rotary tool having a substantially circular cutting edge directed obliquely toward and extending substantially to the top edge of said counterthrust surface to sever a strip of the work uncovered by said counterthrust surface on rotation of the tool.

2. In a machine for beveling the edge of a work, a machine frame, work supporting rings mounted rotatably in the machine frame, one of said rings having a counterthrust surface for supporting an edge surface of the work the height of said counterthrust surface being smaller than the thickness of the work and the other of said rings having a surface for supporting the side of the work adjacent said edge surface, said other ring being exchangeable for similar rings having other thickness to uncover a greater or smaller portion of the edge of the work above the top of the edge supporting ring, and a rotary tool having a substantially circular cutting edge directed obliquely toward and extending substantially to the top edge of said counterthrust surface of the edge supporting ring.

3. In a machine for beveling the edge of a work, a machine frame, work supporting means mounted movably in said frame and having a counterthrust surface for supporting an edge surface of the work and a second surface for supporting one side of the work adjacent the edge surface thereof and located to cause a portion of said edge surface of the work to be uncovered by said edge supporting counterthrust surface, and a rotary tool having an edge directed obliquely toward and extending substantially to the top edge of said counterthrust surface for severing a strip from the work substantially corresponding to the uncovered portion of the edge surface of the work.

4. A machine for beveling the edge of a work as defined in claim 6 and which further includes means for adjusting the angle of the cutting edge of said rotary tool thereby to adjust the beveling angle.

5. A machine for beveling the edge of a work as defined in claim 6 wherein said rotary tool includes a toothed conical peripheral surface adjacent a circular cutting edge for feeding the work simultaneously with the beveling thereof.

6. In a machine for beveling sheet metal works, a machine frame comprising a base, an intermediate frame part and a tool supporting portion, said base and intermediate frame part being telescoped relatively to one another, a spring mounted to support said intermediate part on said base, a stud formed on the intermediate part, bearing means mounted around said stud, work supporting ring means carried by said bearing means and having a counterthrust surface for supporting an edge surface of the work and a surface for supporting the side of the work adjacent said edge surface, said counterthrust surface having a smaller height than the thickness of the work to be beveled, a rotary tool having a substantially circular cutting edge, and means for guiding the tool in the frame with its axis of rotation obliquely to the work so as to direct the cutting edge of the tool toward and substantially reach the top edge of said counterthrust surface supporting the edge of the work.

7. A machine as defined in claim 6 for beveling the end of a rod-shaped work wherein said second surface of said work supporting means comprises a recess forming a seat for the side of the work.

8. In a machine for beveling the edge of a metal plate, rotary work support means having a first surface portion adapted to underlie the edge portion of the plate at the side thereof opposite that which is to be beveled and a second counterthrust surface portion comprising a surface of revolution adapted to engage the lower portion of the edge of the metal plate to be beveled, a rotary cutter having a generally circular cutting edge defined by the intersection of a plane surface and a cone, the plane surface of said cutter being disposed at the required angle with respect to said first surface portion to produce the required bevel, said generally circular cutting edge extending obliquely towards and terminating in a zone closely adjacent to the upper edge of said counterthrust surface portion.

9. In a machine for beveling the edge of a work such as a piece of sheet metal, a machine frame, work supporting means rotatable about an axis parallel to the plane of the work in the operating position thereof, said work supporting means having a substantially plane counterthrust surface for supporting the edge of the work and a substantially cylindrical surface parallel to said axis for supporting one side of the work adjacent said edge thereof, said edge supporting counterthrust surface having a smaller height than the thickness of the work to be beveled, and a rotary tool having a substantially circular cutting edge directed obliquely toward and extending substantially to the top edge of said counterthrust surface to sever a strip of the work uncovered by said counterthrust surface on rotation of said tool.

References Cited in the file of this patent

UNITED STATES PATENTS

| Number | Name | Date |
|---|---|---|
| 250,996 | Stiles | Dec. 13, 1881 |
| 422,726 | Christie et al. | Mar. 4, 1890 |
| 1,210,148 | Cesar | Dec. 26, 1916 |
| 1,289,388 | Calleson | Dec. 31, 1918 |
| 1,406,459 | King | Feb. 14, 1922 |
| 1,426,216 | Roberts et al. | Aug. 15, 1922 |
| 1,578,653 | Gallegher | Mar. 30, 1926 |
| 2,539,401 | Carl et al. | Jan. 30, 1951 |